(12) United States Patent
Nakamura et al.

(10) Patent No.: US 6,707,446 B2
(45) Date of Patent: Mar. 16, 2004

(54) POINTING DEVICE

(75) Inventors: Shuji Nakamura, Tokyo (JP); Takeshi Nishino, Tokyo (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 231 days.

(21) Appl. No.: 09/956,079

(22) Filed: Sep. 20, 2001

(65) Prior Publication Data

US 2002/0033798 A1 Mar. 21, 2002

(30) Foreign Application Priority Data

Sep. 20, 2000 (JP) ........................................ 2000-286030

(51) Int. Cl.$^7$ ................................................. G09G 5/08
(52) U.S. Cl. ........................................ 345/160; 345/157
(58) Field of Search ............................... 345/160, 161, 345/157, 159

(56) References Cited

U.S. PATENT DOCUMENTS

| 5,432,530 A | | 7/1995 | Arita et al. |
| 5,504,502 A | | 4/1996 | Arita et al. |
| 5,714,980 A | * | 2/1998 | Niino ........................... 345/160 |
| 5,772,452 A | * | 6/1998 | Aoyama ........................ 439/74 |
| 5,906,504 A | * | 5/1999 | Igarashi et al. .............. 439/495 |

* cited by examiner

Primary Examiner—Regina Liang
(74) Attorney, Agent, or Firm—Staas & Halsey LLP

(57) ABSTRACT

A pointing device including: a base part; an operating part shiftably supported on the base part; a magnet carried on the operating part; magneto-electro transducers carried on the base part at a location close to the magnet; and a switch mechanism arranged between the base part and the operating part. The operating part includes a first member carrying the magnet and a second member connected to the first member in a mutually shiftable manner. The first member is provided with a rocking center and is rockably supported on the base part, so as to cause a relative displacement between the magnet and the magneto-electro transducers. The second member is capable of rocking together with the first member about the rocking center and of shifting relative to the first member in a motion different from a rocking motion, so as to actuate the switch mechanism.

12 Claims, 10 Drawing Sheets

POINTING DEVICE

BACKGROUND OF THE INVENTION

1. Field of the Invention

The present invention relates, generally, to an input device for electronic equipment and, more particularly, to a pointing device capable of being installed in a digital data processors with displays.

2. Description of the Related Art

It is well known that, in digital data processors with displays and keyboards, such as personal computers, word processors, personal digital assistants (PDAs), etc., a pointing device is incorporated as an auxiliary input device for enabling an operator to manually enter analogue-type information so as to direct two-dimensional coordinate data, such as cursor shifting data, on a display screen. Particularly, a small-sized portable data processor generally integrally incorporates the pointing device in the casing of the processor.

The pointing device including a base part, an operating part shiftably supported on the base part, a magneto-electro transducer carried on the base part, a magnet carried on the operating part to be arranged opposite to the magneto-electro transducer, and a switch mechanism arranged between the base part and the operating part has been known in the art (see, e.g., Japanese Examined Patent Publication (Kokoku) No. 7-117876 (JP-B-7-117876)). In this pointing device, an operator manipulates the operating part to shift it in a generally horizontal direction on the base part, so as to change the positional correlation between the magnet and the magneto-electro transducer and thereby to vary the output voltage of the magneto-electro transducer. It is possible, through this operation, to enter analogue information corresponding to the shifting direction and shifting distance of the operating part. Also, the operator manipulates the operating part to push it toward the base part, so as to actuate the switch mechanism. It is possible, through this operation, to make the switch mechanism output a click signal. In this respect, in order to allow the pointing device to output analogue data signals in a two-dimensional coordinate system, a plurality of magneto-electro transducers are arranged in a given horizontal plane on the base part.

In the above-described conventional pointing device with the magneto-electro transducer, when the operating part is pushed to actuate the switch mechanism, the positional correlation between the magnet and the magneto-electro transducer is inevitably changed. In this operation, if the shifting direction of the magnet due to the pushed-down motion of the operating part includes a horizontal component in relation to the plural magneto-electro transducers on the base part, the output voltages of the magneto-electro transducers tend to vary, and thus a signal of analogue data, such as cursor shifting data, tends to be output from the pointing device, just before the switch mechanism effects a click operation upon being actuated. Therefore, in order to perform a proper click operation, it is necessary to push down accurately in a vertical direction in relation to the base part, which in turn requires the provision of an additional guide mechanism or otherwise skillfulness on the part of the operator.

Incidentally, the pointing device with the magneto-electro transducer is generally capable of reducing the exposed area of the operating part in the upper face of the casing of a data processor, into which the pointing device is installed, without deteriorating the operability of the pointing device. Therefore, it is possible to effectively install this type of pointing device into portable information apparatuses for hand-held operation, such as electronic notebooks, personal digital assistants (PDAs), etc. In the case where the pointing device is installed in a portable information apparatus, it is required to stably and effectively connect the pointing device with the major circuit board of the information apparatus in both electrical and mechanical ways, regardless of the relatively narrow interior space of the casing of the portable apparatus.

SUMMARY OF THE INVENTION

It is therefore an object of the present invention to provide a pointing device including a magneto-electro transducer and a switch mechanism, capable of easily performing a proper and accurate click operation through a manipulation mode clearly different from that for an analogue data entering operation, without requiring any additional guiding mechanism or operator's skillfulness.

It is another object of the present invention to provide a pointing device including a magneto-electro transducer, capable of being stably and effectively connected with an external circuit board in both electrical and mechanical ways even in a narrow space.

In accordance with the present invention, there is provided a pointing device, comprising a base part; an operating part shiftably supported on the base part; a magnet carried on one of the base part and the operating part; a magneto-electro transducer carried on the other of the base part and the operating part at a location close to the magnet; and a switch mechanism arranged between the base part and the operating part; wherein the operating part includes a first member carrying the magnet or the magneto-electro transducer and a second member connected to the first member in a mutually shiftable manner, the first member capable of shifting relative to the base part so as to cause a relative displacement between the magnet and the magneto-electro transducer, the second member capable of shifting relative to the first member so as to actuate the switch mechanism.

In this pointing device, it is preferred that the first member of the operating part is provided with a rocking center and is rockably supported on the base part, and that the second member of the operating part is capable of rocking together with the first member about the rocking center and of shifting relative to the first member in a motion different from a rocking motion.

The second member of the operating part may be capable of linearly shifting along an axis extending through the rocking center relative to the first member.

The base part may include a base plate portion carrying the switch mechanism and a support portion fixedly joined to the base plate portion and rockably supporting the first member of the operating part above the switch mechanism, and the second member of the operating part may extend through the support portion to be able to be abutted to the switch mechanism.

In this arrangement, the second member of the operating part may include a plurality of wall portions extending through the support portion of the base part, the first member being slidably engaged internally with the wall portions.

Alternatively, the second member of the operating part may include one column portion extending through the support portion of the base part, the first member being slidably engaged externally with the column portion.

Also, in this pointing device, it is advantageous that the second member of the operating part is supported on the switch mechanism.

It is also preferred that the base part includes a base plate portion connected respectively with the magneto-electro transducer and the switch mechanism and a connector for electrically connecting the magneto-electro transducer and the switch mechanism to an external circuit board, and that the connector includes an insulating member fixedly joined to an outer peripheral region of the base plate portion and a plurality of terminals supported on the insulating member in a mutually insulating arrangement in an array, each of the terminals being electrically connected at one end thereof with the magneto-electro transducer and the switch mechanism through the base plate portion, the one end of each terminal cooperating with the insulating member to hold therebetween the outer peripheral region of the base plate portion.

Preferably, the base part includes a base plate portion connected respectively with the magneto-electro transducer and the switch mechanism and a fitting portion extending outward from the base plate portion, the base part capable of being fitted through the fitting portion to an external circuit board.

In this case, the pointing device may further comprise an elastic member for elastically positioning the first member of the operating part at an initial balanced position on the base part, and the fitting portion of the base part may be integrally joined to the elastic member.

The present invention also provides a pointing device, comprising a base part; an operating part shiftably supported on the base part; a magnet carried on one of the base part and the operating part; and a magneto-electro transducer carried on the other of the base part and the operating part at a location close to the magnet; wherein the base part includes a base plate portion connected with the magneto-electro transducer and a connector for electrically connecting the magneto-electro transducer to an external circuit board; and wherein the connector includes an insulating member fixedly joined to an outer peripheral region of the base plate portion and a plurality of terminals supported on the insulating member in a mutually insulating arrangement in an array, each of the terminals being electrically connected at one end thereof with the magneto-electro transducer through the base plate portion, the one end of each terminal cooperating with the insulating member to hold therebetween the outer peripheral region of the base plate portion.

The present invention further provides a pointing device, comprising a base part; an operating part shiftably supported on the base part; a magnet carried on one of the base part and the operating part; and a magneto-electro transducer carried on the other of the base part and the operating part at a location close to the magnet; wherein the base part includes a base plate portion connected with the magneto-electro transducer, a support portion fixedly joined to the base plate portion and shiftably supporting the operating part above the base plate portion, and a fitting portion extending outward from the base plate portion, the base part capable of being fitted through the fitting portion to an external circuit board.

In this arrangement, the pointing device may further comprise an elastic member for elastically positioning the operating part at an initial balanced position on the base part, and the fitting portion of the base part may be integrally joined to the elastic member.

BRIEF DESCRIPTION OF THE DRAWINGS

The above and other objects, features and advantages of the present invention will become more apparent from the following description of preferred embodiments in connection with the accompanying drawings, in which.

DESCRIPTION OF THE PREFERRED EMBODIMENT

Figure 1:
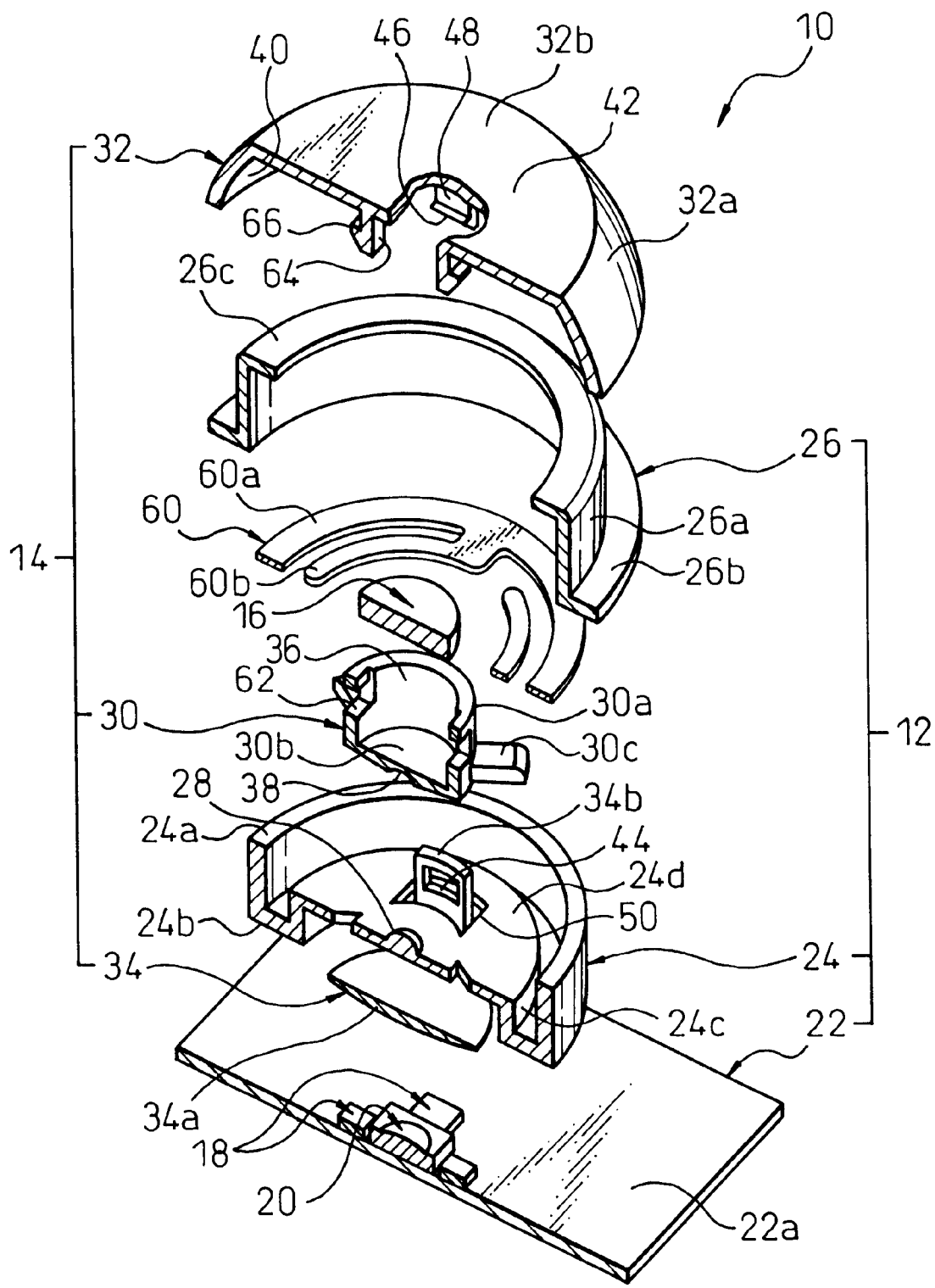
FIG. 1 is an exploded, vertical sectional perspective view of a pointing device according to a first embodiment of the present invention, particularly showing the substantially half bodies of cylindrical or circular components.
Figure 2:
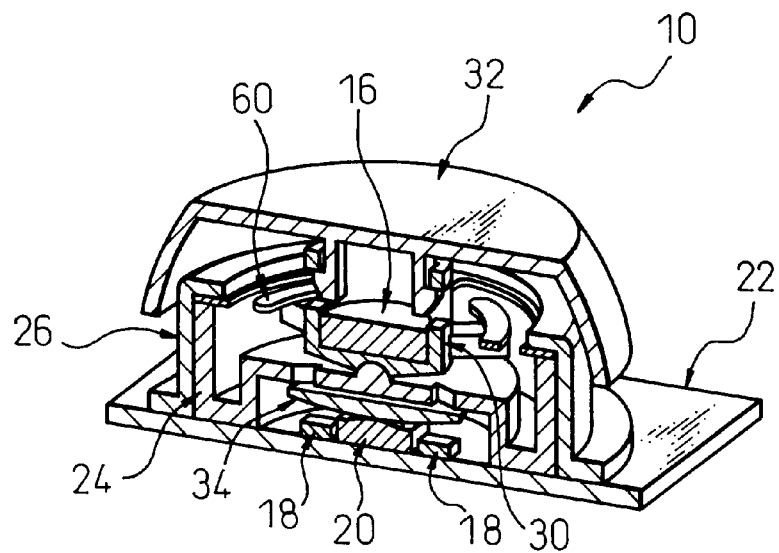
FIG. 2 is an assembled perspective view of the pointing device of FIG. 1, showing the substantially half body of the assembled pointing device.

Referring now to the drawings, in which the same or similar components are denoted by common reference numerals, FIG. 1 shows a pointing device 10, according to the first embodiment of the present invention, in an exploded perspective view, and FIG. 2 shows the pointing device 10 in an assembled state, both particularly showing the substantially half bodies of cylindrical or circular components of the pointing device 10. The pointing device 10 is capable of being used for digital data processors, such as personal computers, word processors, personal digital assistants (PDAs), etc., as an auxiliary input device for directing two-dimensional coordinate data on a display screen, and being integrally incorporated in the casing of such a data processor.

The pointing device 10 includes a base part 12, an operating part 14 supported on the base part 12 in a freely shiftable manner, a disk-shaped magnet (such as a permanent magnet) 16 carried on the operating part 14, a plurality of magneto-electro transducers (such as Hall-effect elements) 18 carried on the base part 12 at locations close to the magnet 16, and a switch mechanism 20 disposed between the base part 12 and the operating part 14. The base part 12 includes a circuit board (or a base plate portion) 22, on which electronic components including a CPU (not shown) are mounted, and first and second frames (or support portions) 24, 26 fixedly joined in a mutually assembled state to the circuit board 22. The circuit board 22 has a generally flat major surface 22a, on which the switch mechanism 20 is mounted at a predetermined position, and on which four (only three are visible in the drawing) magneto-electro transducers 18 are mounted at regular intervals in a circumferential direction about the switch mechanism 20. This configuration of the magneto-electro transducers 18 is provided for allowing the pointing device 10 to output an analog data signal in a two-dimensional coordinate system. The first and second frames 24, 26 serve to support the operating part 14 in a three-dimensionally rockable manner about a rocking center defined on the base part 12.

The first frame 24 of the base part 12 is provided integrally with a cylindrical outer circumferential wall 24a, an annular end wall 24b extending radially inward from one axial end of the outer circumferential wall 24a, a cylindrical inner circumferential wall 24c extending in parallel to the outer circumferential wall 24a from the inner peripheral edge of the end wall 24b, and a disk-shaped support wall 24d located at a position axially deviated from the end wall 24b and extending radially inward from the inner circumferential wall 24c. At a center of the upper surface of the support wall 24d of the first frame 24, a hemispherical projection 28 is formed for defining a pivotal or rocking center P (see FIG. 6) of the operating part 14. The first frame 24 is fixed to the circuit board 22 with the end wall 24b being abutted to the surface 22a of the circuit board 22. In this respect, the switch mechanism 20 and the four magneto-electro transducers 18, both mounted on the surface 22a of the circuit board 22, are accommodated in a space defined between the inner and support walls 24c, 24d of the first frame 24 and the circuit board 22, so that the projection 28 formed at the upper center of the support wall 24d is located at a position vertically above the switch mechanism 20.

The second frame 26 of the base part 12 is provided integrally with a cylindrical circumferential wall 26a, an annular flange 26b extending radially outward from one axial end of the circumferential wall 26a, and an annular end wall 26c extending radially inward from another axial end of the circumferential wall 26a. The second frame 26 is fixed to the circuit board 22 with the flange 26b being abutted to the surface 22a of the circuit board 22, so that the outer wall 24a of the first frame 24 is accommodated inside the circumferential wall 26a so that they are substantially in contact with each other. In this regard, the first and second frames 24, 26 may be fixedly joined to the circuit board 22 by using well-known fastening means, such as bolts (not shown).

The operating part 14 includes a holder (or a first member) 30 for carrying the magnet 16, and an assembly (or a second member) of a cover 32 and a pusher 34, coupled to the holder 30 to be shiftable relative to the holder 30. The holder 30 is provided integrally with a cylindrical peripheral wall 30a, a generally disk-shaped bottom wall 30b extending radially inward from one axial end of the peripheral wall 30a, and three arms 30c (only two are visible in the drawing) arranged at regular intervals in a circumferential direction and discretely extending radially outward from the outer circumference of the peripheral wall 30a. The magnet 16 having a generally disk shape is fixedly accommodated in a recess 36 defined by the peripheral wall 30a and the bottom wall 30b of the holder 30. The back side of the bottom wall 30b away from the recess 36 extends bulgingly in a generally conical shape from the outer periphery to the center thereof, and a hemispherical dent 38 is formed at the bulging center area of the back side. The dent 38 is capable of slidably receiving the projection 28 formed on the first frame 24 of the base part 12 in a mutually close contact manner.

The cover 32 of the operating part 14 is provided integrally with an annular peripheral wall 32a with a spherically curved shape, and a generally disk-shaped end wall 32b extending radially inward from one end of the peripheral wall 32a. The peripheral and end walls 32a, 32b of the cover 32 define a recess 40 capable of receiving at least a part of the second frame 26 of the base part 12 without interfering with the second frame 26 during the rocking motion of the operating part 14 as described later. The surface of the end wall 32b of the cover 32, facing away from the recess 40, functions as an operating surface 42 which an operator touches with his hand or finger.

The pusher 34 of the operating part 14 is provided integrally with a generally disk-shaped end wall 34a, and with three joint walls 34b (only one is visible in the drawing) arranged at regular intervals in a circumferential direction and discretely extending generally orthogonal to the end wall 34a from the outer periphery of the end wall 34a. The radially inner surfaces of the respective joint walls 34b are formed as arcuate surfaces capable of being in sliding contact with the cylindrical outer surface of the peripheral wall 30a of the holder 30. Thereby, the holder 30 is engaged internally with the three joint walls 34b of the pusher 34 in a slidable manner with substantially no gap defined therebetween. Each joint wall 34b is provided with an opening 44 formed in the vicinity of a free end thereof. In association with this arrangement, three engagement tabs 48 (only one is visible in the drawing), each having an inward hook 46, are provided to project uprightly from the end wall 32b into the recess 40, in a configuration corresponding to the configuration of three joint walls 34b of the pusher 34. The cover 32 and the pusher 34 are securely assembled with each other when the hooks 46 of the respective engagement tabs 48 are closely engaged, in a snap fit manner, with the openings 44 of the respective joint walls 34b.

The end wall 34a of the pusher 34 of the operating part 14 is accommodated in the space defined between the inner and support walls 24c, 24d of the first frame 24 and the circuit board 22, in the base part 12, and is disposed opposite to the switch mechanism 20 on the circuit board 22 so as to be able to be abutted with the switch mechanism 20. In association with this arrangement, the first frame 24 is provided in the support wall 24d with three through-holes 50 in a configuration corresponding to the configuration of three joint walls 34b of the pusher 34, for allowing each joint wall 34b to be inserted into each through hole 50 with a gap defined therebetween. Each through-hole 50 is shaped and dimensioned so as not to disturb the rocking motion of each joint wall 34b, caused by the rocking motion of the operating part 14 as described later. The end wall 34a of the pusher 34 is provided with a surface, away from the joint walls 34b, extending bulgingly in a spherical shape from the outer periphery toward the center thereof, and is constantly placed with the bulging center area thereof on the upper end face of the switch mechanism 20. Accordingly, in this embodiment, the second member of the operating part 14, including the cover 32 and the pusher 34, is supported on the switch mechanism 20.

Figure 3:
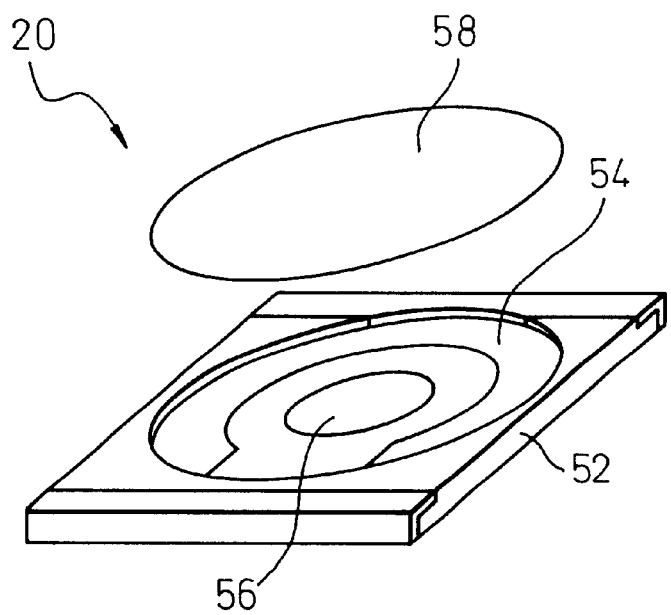
FIG. 3 is a partially exploded perspective view of a switch mechanism installed in the pointing device of FIG. 1.
Figure 4:
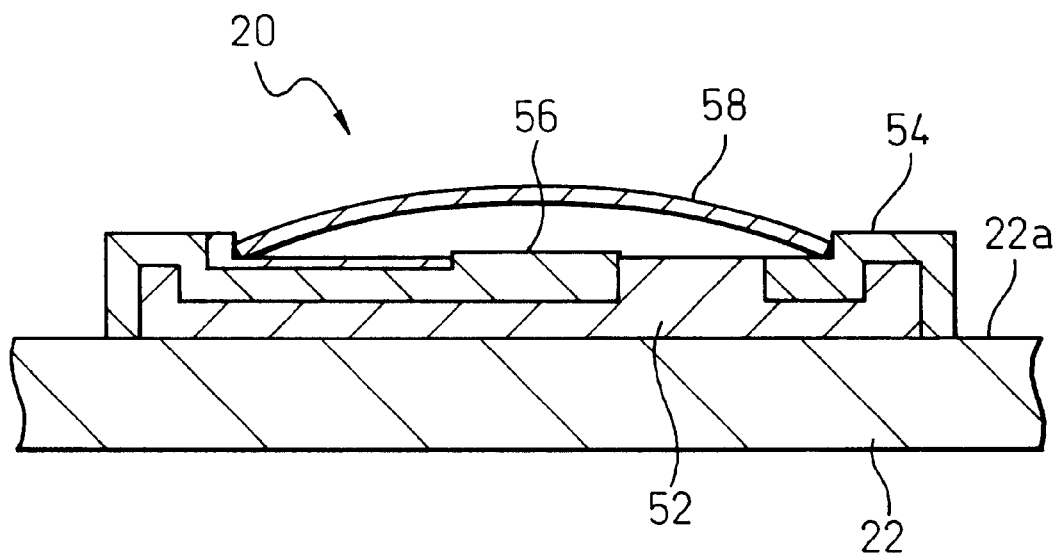
FIG. 4 is an assembled, vertical sectional view of the switch mechanism of FIG. 3.

As shown in FIGS. 3 and 4, the switch mechanism 20 includes an insulating substrate 52 placed on the surface 22a of the circuit board 22, a pair of stationary contact plates 54, 56 spaced from each other and fixedly formed on the insulating substrate 52, and a movable contact plate 58 movably mounted on the insulating substrate 52. The movable contact plate 58 has, in itself, the structure of a coned disk spring, and exhibits a dome-like curved profile as illustrated when no load is applied thereto, so as to come into contact at a part of the outer periphery thereof with only one stationary contact plate 54. The movable contact plate 58 is also elastically deformed upon being pressed toward the insulating substrate 52, so as to come into contact at the center area thereof with the other stationary contact plate 56. In this condition, the pair of stationary contact plates 54, 56 are electrically connected or short-circuited with each other through the movable contact plate 58, so as to close a circuit. When a pressing force is released, the movable contact plate 58 immediately recovers the initial dome-like profile, so as to open the circuit. The end wall 34a of the pusher 34 in the operating part 14 is placed on the outer surface of the movable contact plate 58 and is supported by the essential spring force of the movable contact plate 58. In this regard, it should be noted that the above structure of the switch mechanism 20 is merely one example, and another known structure for a switch mechanism, capable of opening/closing due to the function of the pusher 34 of the operating part 14, may be adopted in the present invention.

Figure 5:
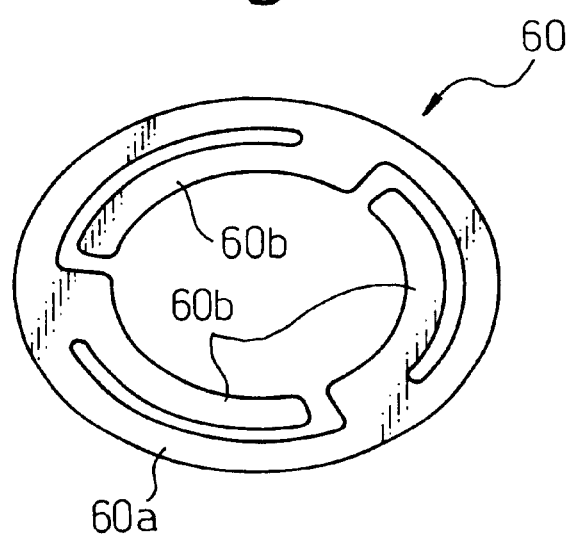
FIG. 5 is a perspective view of an elastic member installed in the pointing device of FIG. 1.

The pointing device 10 further includes a plate spring 60 acting as an elastic member for elastically positioning the holder 30 of the operating part 14 at an initial balanced position on the first frame 24 of the base part 12. The plate spring 60 is a thin-plate member formed by, e.g., stamping a spring steel sheet and, as shown in FIG. 5, includes a generally circular or annular first portion 60a engageable with the base part 12 and three second portions 60b integrally extending from the first portion 60a so as to be engageable with the operating part 14. The first portion 60a of the plate spring 60 is fixedly held in the base part 12 between the outer wall 24a of the first frame 24 and the end wall 26c of the second frame 26 (see FIG. 2). Three second portions 60b of the plate spring 60 are arranged inside the first portion 60a in regular intervals in a circumferential direction and respectively extend arcuately along the first portion 60a, so that the free ends of the respective second portions 60b are placed on the corresponding arms 30c of the holder 30 of the operating part 14. As shown in FIG. 5, in the case where no load is applied to the plate spring 60, the first portion 60a and the second portions 60b thereof are disposed on substantially identical horizontal planes. In this state, when an external force is respectively applied to the second portions 60b, each second portion 60b is elastically deformed so as to exhibit a spring action against the external force.

The plate spring 60 functions in the respective second portions 60b to apply a spring biasing force to the respective arms 30c of the holder 30 downward or in a direction toward the circuit board 22, during the period when the holder 30 is shifted to pivot or rock on the first frame 24, in association with the direction and angle of the pivotal or rocking motion of the holder 30. This spring force is transmitted to the cover 32 through the pusher 34 engaged with the holder 30. Consequently, the operator is able to manipulate the cover 32 of the operating part 14 so as to shift it for rocking against the spring force caused by the plate spring 60. Also, the holder 30 is biased, together with the magnet 16, the cover 32 and the pusher 34 in the integral manner, toward the initial balanced position due to the spring force, whereby these components stably return to the initial balanced position immediately after a manipulating force for the rocking motion, applied by the operator, is released. In the initial balanced position, the operating surface 42 of the cover 32 is arranged substantially parallel to the surface 22a of the circuit board 22, and the four magneto-electro transducers 18 on the circuit board 22 are disposed at substantially equal distances from the magnet 16 on the operating part 14.

In the pointing device 10 having the above structure, the holder 30, as the first member of the operating part 14, is supported in a freely rockable manner on the projection 28 of the first frame 24 of the base part 12, while being slidably engaged with the insides of the three joint walls 34b of the pusher 34 as the second member of the operating part 14. As a result, the holder 30 is supported, together with the magnet 16, the cover 32 and the pusher 34 in the integral manner, on the first frame 24 so as to be three-dimensionally rockable over 360 degrees about the rocking center P defined by an interengagement between the projection 28 and the dent 38 (i.e., an omnidirectional rocking motion). In this state, the magnet 16 is spaced, by variable distances, from the four magneto-electro transducers 18 on the circuit board 22.

Figure 6:
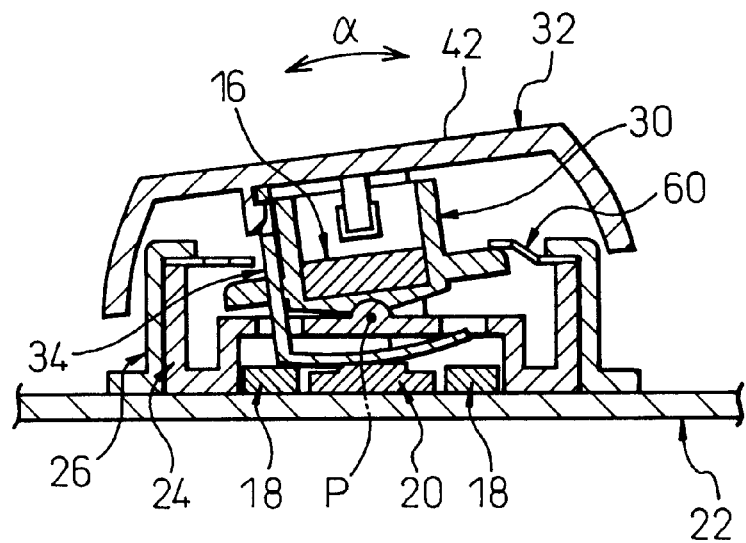
FIG. 6 is a vertical sectional view of the pointing device of FIG. 1, for explaining a rocking motion of an operating part.

Accordingly, as shown in FIG. 6, it is possible for the operator to manipulate the cover 32, in a rocking motion as shown by an arrow α, against the spring force of the plate spring 60, so as to change the positional correlation between the magnet 16 and the respective magneto-electro transducers 18, and thus to vary the output voltages from the respective magneto-electro transducers 18, in association with the direction and angle in the rocking motion of the cover 32. The variation in the output voltages from the respective magneto-electro transducers 18 is processed as analog information in the CPU (not shown) on the circuit board 22, and is converted to digital coordinate data. The digital coordinate data as converted are then output via a connector section (not shown) provided in the circuit board 22 to a processing mechanism of a data processor (not shown). In this manner, it is possible to shift, e.g., a cursor or pointer on the display screen of the data processor in a desired direction by a desired distance, in correspondence to the rocking direction and angle of the cover 32 of the operating part 14.

Also, the cover 32 and pusher 34, constituting the second member of the operating part 14, are not only rockable together with the holder 30 but are also linearly movable relative to the holder 30 and magnet 16, along an axis passing through the rocking center P, as another motion different from the three-dimensional rocking motion, under a mutual guiding function in the peripheral wall 30a of the holder 30 and the three joint walls 34b of the pusher 34. That is, the cover 32 and pusher 34 are capable of being linearly moved on the base part 12 independently from the magnet 16. Such a linear motion of the cover 32 and pusher 34 is conducted for applying or releasing a pressing force acting on the movable contact plate 58 of the switch mechanism 20, on which the pusher 34 is supported.

Figure 7:
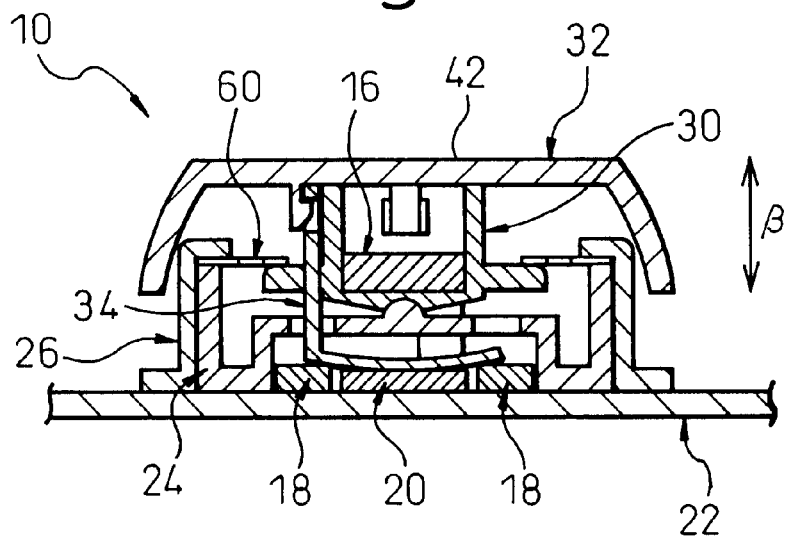
FIG. 7 is a vertical sectional view of the pointing device of FIG. 1, for explaining a linear motion of an operating part.

Accordingly, as shown in FIG. 7, it is possible for the operator to manipulate the cover 32, in a linear motion as shown by an arrow β, against the spring force of the movable contact plate 58 in the switch mechanism 20, so as to actuate the switch mechanism 20, without changing the positional correlation between the magnet 16 and four magneto-electro transducers 18. When the switch mechanism 20 is actuated to close, the CPU on the circuit board 22 processes a click signal thus generated from the switch mechanism 20 and outputs the same to the processing mechanism of the data processor. In this manner, it is possible to perform, e.g., a click operation for the pointer on the display screen by pressing the cover 32 of the operating part 14. In this regard, to prevent the operator from unintentionally actuating the switch mechanism 20 during the rocking motion of the operating part 14 by an operating force applied to the cover 32, it is preferred to properly select the materials and/or sizes of the movable contact plate 58 of the switch mechanism 20, so as to suitably adjust the spring force of the movable contact plate 58.

As stated above, according to the pointing device 10 of the present invention, it is possible to push the operating part 14 toward the base part 12, without changing the positional correlation between the magnet 16 and the magneto-electro transducers 18, when it is required to actuate the switch mechanism 20. This motion is capable of being properly conducted in a state where the operating part 14 is not only in the initial balanced position but also in any desired rocking-angle position. Accordingly, in the pointing device 10, it is not necessary to accurately shift the operating part 14 in the vertical direction relative to the base part 12 for the click operation. As a result, it is possible to easily perform a proper and accurate click operation through a manipulation mode clearly different from that for an analogue data entering operation, without requiring the provision of any additional vertically-guiding mechanism and/or an operator's skill.

In the above structure, it is advantageous that a supplementary coupling structure is provided to assist the coupling of the holder 30 with the cover 32 so as to transmit, with substantially no loss, a rocking operation force caused by the operator and a spring force generated from the plate spring 60 as a reaction of the operation force, between the first member (or the holder 30) and the second member (or the cover 32 and pusher 34) in the operating part 14. In the illustrated embodiment, the supplementary coupling structure includes a pair of openings 62 provided at two desired positions opposite to each other in the peripheral wall 30a of the holder 30, and a pair of additional engagement tabs 64 projecting uprightly into the recess 40 from the end wall 32b of the cover 32 in a configuration corresponding to the configuration of the openings 62. Each additional engagement tab 64 of the cover 32 is provided at the distal end thereof with an outward hook 66 capable of being snap-fitted with each opening 62 of the holder 30. In this case, it is desirable that the opening 62 of the holder 30 has an axial dimension for allowing the axial displacement of the counterpart hook 66 of the engagement tab 64 of the cover 32 over, at least, the shifting distance of the pusher 34 required for the click operation, while has a circumferential dimension for enabling the pusher 34 to be prevented from rotating. In this manner, the holder 30 and the cover 32 are coupled to each other to be movable substantially solely in the axial direction, so that it is possible to transmit the force between the holder 30 and the cover 32 with substantially no loss.

Figure 8:
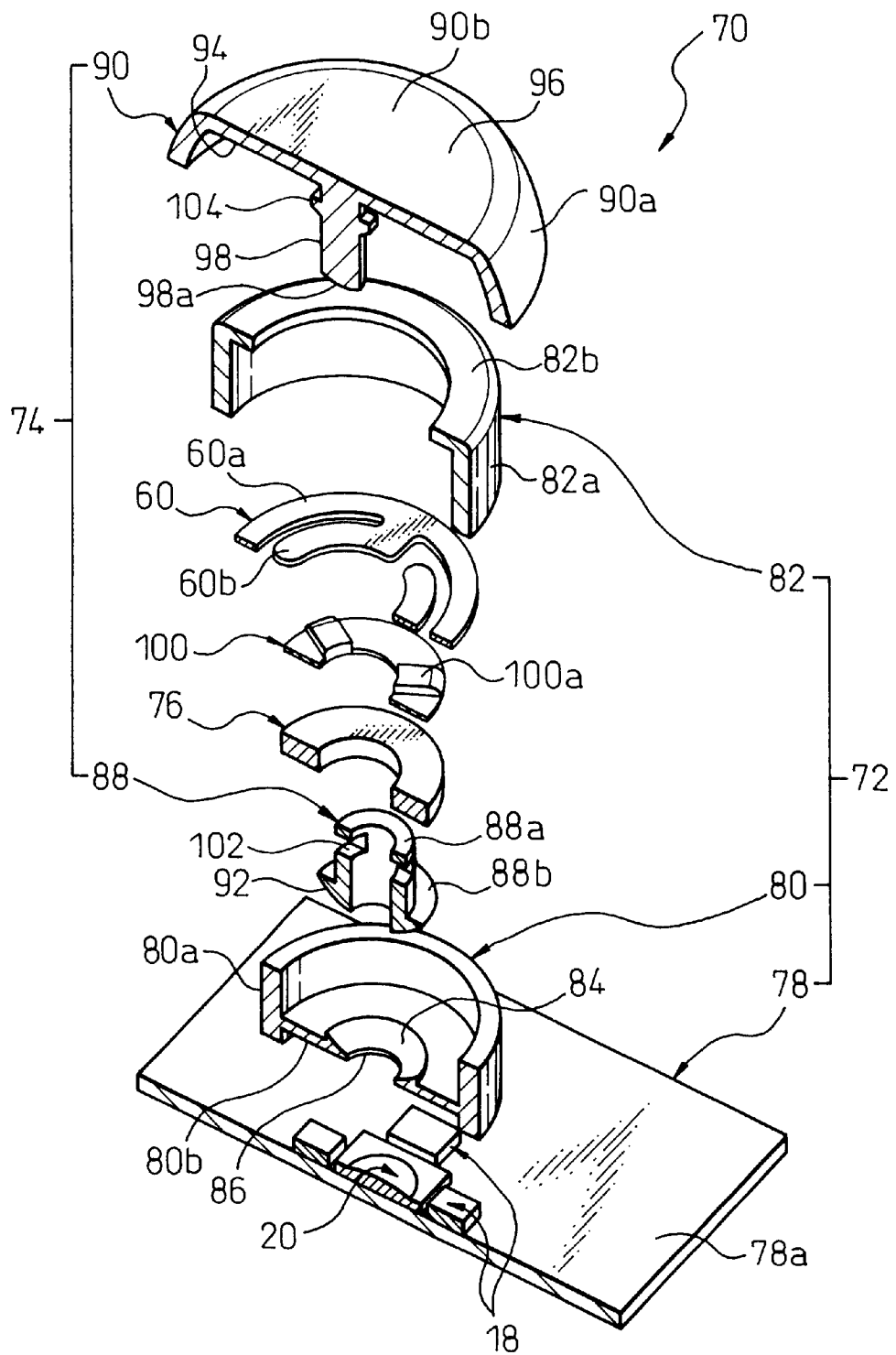
FIG. 8 is an exploded, vertical sectional perspective view of a pointing device according to a second embodiment of the present invention, particularly showing the substantially half bodies of cylindrical or circular components.
Figure 9:
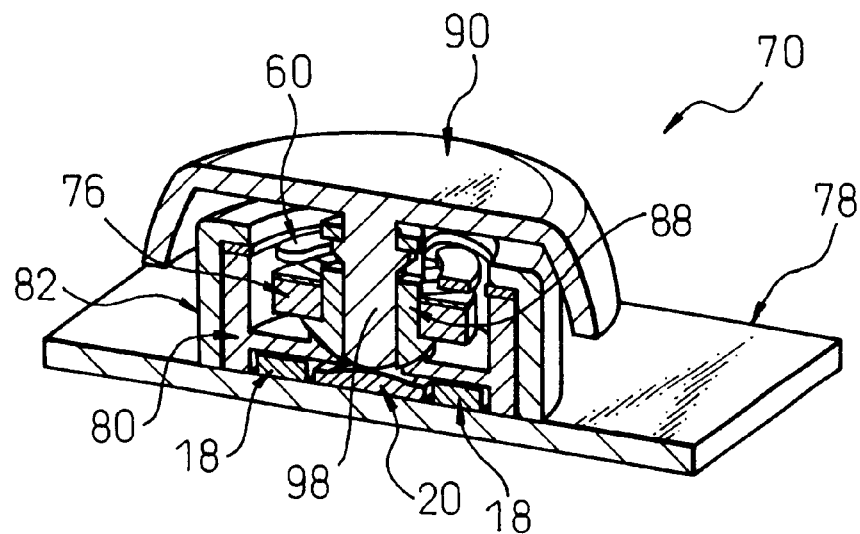
FIG. 9 is an assembled perspective view of the pointing device of FIG. 8, showing the substantially half body of the assembled pointing device.

FIGS. 8 and 9 illustrate a pointing device 70, according to the second embodiment of the present invention, in half-cut exploded and assembled perspective views, respectively, corresponding to FIGS. 1 and 2. The pointing device 70 has substantially the same structure as the pointing device 10 of the first embodiment, except for the constitution of a base part 72, an operating 74 and a magnet 76, so that corresponding components are denoted by the common reference numerals and the explanation thereof is not repeated.

The pointing device 70 includes a base part 72, an operating part 74 shiftably supported on the base part 72, an annular magnet (e.g., a permanent magnet) carried on the operating part 74, a plurality of magneto-electro transducers 18 carried on the base part 72 in the vicinity of the magnet 76, and a switch mechanism 20 disposed between the base part 72 and the operating part 74. The base part 72 includes a circuit board (or a base plate portion) 78, on which electronic components including a CPU (not shown) are mounted, and first and second frames (or support portions) 80, 82 fixedly joined in a mutually assembled state to the circuit board 78. The circuit board 78 has a generally flat major surface 78a, on which the switch mechanism 20 is mounted at a predetermined position, and on which four (only three are visible in the drawing) magneto-electro transducers 18 are mounted at regular intervals in a circumferential direction about the switch mechanism 20. The first and second frames 80, 82 serve to support the operating part 74 in a three-dimensionally rockable manner about a rocking center defined on the base part 72.

The first frame 80 of the base part 72 is provided integrally with a cylindrical outer circumferential wall 80a and an annular support wall 80b located at a position axially deviated from one axial end of the outer circumferential wall 80a and extending radially inward from the outer wall 80a. In a central area of the upper side of the support wall 80b of the first frame 80, a generally spherical concave surface 84 is formed to define a rocking center P (see FIG. 10) of the operating part 74, and a circular through-hole 86 passing through the support wall 80b is formed at a center of the concave surface 84. The first frame 80 is fixed to the circuit board 78 with one axial end of the outer circumferential wall 80a being abutted to the surface 78a of the circuit board 78. In this respect, the switch mechanism 20 and four magneto-electro transducers 18, both mounted on the surface 78a of the circuit board 78, are accommodated in a space defined between the outer and support walls 80a, 80b of the first frame 80 and the circuit board 78, so that the through-hole 86 formed at the center of the support wall 80b is located at a position vertically above the switch mechanism 20.

The second frame 82 of the base part 72 is provided integrally with a cylindrical circumferential wall 82a and an annular end wall 82b extending radially inward from one axial end of the circumferential wall 82a. The second frame 82 is fixed to the circuit board 78 with another axial end of the circumferential wall 82a being abutted to the surface 78a of the circuit board 78, so that the outer wall 80a of the first frame 80 is accommodated inside the circumferential wall 82a in a way as to be substantially in contact with each other. In this regard, the first and second frames 80, 82 may be fixedly joined to the circuit board 78 by using well-known fastening means, such as bolts (not shown). The first portion 60a of the plate spring 60 is fixedly held between the outer wall 80a of the first frame 80 and the end wall 82b of the second frame 82.

The operating part 74 includes a holder (or a first member) 88 for carrying the magnet 76, and a cover (or a second member) 90 coupled to the holder 88 to be shiftable relative to the holder 88. The holder 88 is provided integrally with a cylindrical peripheral wall 88a and an annular flange 88b extending radially outward from the outer surface of the peripheral wall 88a. The annular magnet 76 is fit to the holder 88 so as to encircle the cylindrical outer surface of the peripheral wall 88a, and placed on the flat annular surface of the flange 88b. The holder 88 is also provided at one axial end of the peripheral wall 88a with a distal end surface 92 extending bulgingly in a spherical shape between a cylindrical inner surface of the peripheral wall 88a and an annular surface of the flange 88b. The distal end surface 92 is capable of being slidably received on the concave surface 84 provided in the first frame 80 of the base part 72 in a mutually close-contacting manner.

The cover 90 of the operating part 74 is provided integrally with an annular peripheral wall 90a with a spherically curved shape, and a generally disk-shaped end wall 90b extending radially inward from one end of the peripheral wall 90a. The peripheral wall 90a and the end wall 90b of the cover 90 define a recess 94 capable of receiving at least a part of the second frame 82 of the base part 72 without interfering with the second frame 82 during the rocking motion of the operating part 74 as described later. The surface of the end wall 90b of the cover 90, facing away from the recess 94, functions as an operating surface 96, on which an operator touches his hand or finger. The cover 90 is also provided integrally on the end wall 90b with a generally cylindrical pusher 98 uprightly projecting at the center of a surface defining the recess 94. The pusher 98 is received within the peripheral wall 88a of the holder 88 with the cylindrical outer surface of the pusher 98 being in slidable contact with the cylindrical inner surface of the peripheral wall 88a. Thus, the pusher 98 is engaged with the holder 88 in a slidable manner with substantially no gap defined therebetween The distal end 98a of the pusher 98 integrally formed with the cover 90 of the operating part 74 passes through the through-hole 86 in the support wall 80b of the first frame 80 of the base part 72 to enter a space defined between the outer circumferential wall 80a, the support wall 80b and the circuit board 78, and is disposed opposite to the switch mechanism 20 on the circuit board 78 so as to be capable of being abutted with the switch mechanism 20. The through-hole 86 of the first frame 80 is shaped and dimensioned so as not to disturb the rocking motion of the pusher 98, caused by the rocking motion of the operating part 74 as described later. The distal end 98a of the pusher 98 preferably has an outer surface extending bulgingly in a spherical shape, and is constantly placed with the bulging center area thereof on the upper end face of the switch mechanism 20. Accordingly, in this embodiment, the second member of the operating part 74, including the cover 90, is supported on the switch mechanism 20.

In the pointing device 70, the plate spring 60 for elastically positioning the holder 88 of the operating part 74 at an initial balanced position on the first frame 80 of the base part 72 applies a spring biasing force generated from three second portions 60b of the spring 60 to the holder 88 through the magnet 76 carried on the holder 88. Accordingly, it is preferred that, in order to avoid the damage to the magnet 76, an annular seat plate 100 is placed on the magnet 76. The seat plate 100 serves to be engaged at three ribs 100a (only two are visible in the drawing) formed on the upper side thereof with the free ends of three second portions 60b of the plate spring 60, respectively, and to receive the spring force generated from the second portions 60b. Also, the seat plate 100 may be fixed to the peripheral wall 88a of the holder 88 by, e.g., an adhesive, so as to function as a stopper for securely supporting the magnet 76 on the holder 88.

The spring force generated from the respective second portions 60b of the plate spring 60 is loaded to the holder 88 through the seat plate 100 and the magnet 76, and then is transmitted to the cover 90 through the pusher 98 engaged with the holder 88. Consequently, the operator is allowed to manipulate the cover 90 of the operating part 74 so as to shift it for rocking against the spring force generated from the plate spring 60. Also, the holder 88 is biased, together with the magnet 76 and the cover 90 in the integral manner, toward the initial balanced position due to the spring force, whereby these components stably return to the initial balanced position immediately after a manipulating force for the rocking motion, applied by the operator, is released. In the initial balanced position, the operating surface 96 of the cover 90 is arranged substantially parallel to the surface 78a of the circuit board 78, and the four magneto-electro transducers 18 on the circuit board 78 are disposed at substantially equidistance from the magnet 76 on the operating part 74.

In the pointing device 70 having the above structure, the holder 88, as the first member of the operating part 74, is rockably supported on the concave surface 84 of the first frame 80 of the base part 72, while slidably receiving the pusher 98 of the cover 90 as the second member of the operating part 74. As a result, the holder 88 is supported, together with the magnet 76 and the cover 90 in the integral manner, on the first frame 80 so as to be three-dimensionally rockable over 360 degrees about the rocking center P defined by an interengagement between the concave surface 84 and the disal end surface 92 (i.e., an omnidirectional rocking motion). In this state, the magnet 76 is spaced at variable distances from the four magneto-electro transducers 18 on the circuit board 78.

Figure 10:
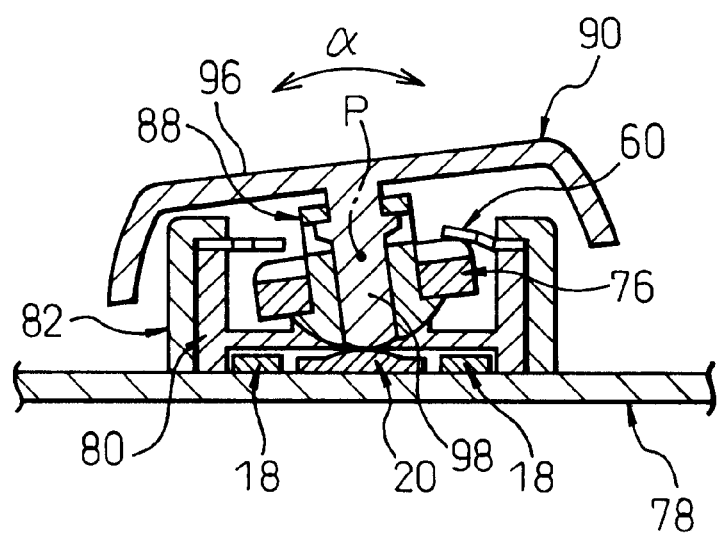
FIG. 10 is a vertical sectional view of the pointing device of FIG. 8, for explaining a rocking motion of an operating part.

Accordingly, as shown in FIG. 10, it is possible for the operator to manipulate the cover 90, in a rocking motion as shown by an arrow α, against the spring force of the plate spring 60, so as to change the positional correlation between the magnet 76 and the respective magneto-electro transducers 18, and thus to vary the output voltages from the respective magneto-electro transducers 18, in association with the direction and angle in the rocking motion of the cover 90. The variation of the output voltages from the respective magneto-electro transducers 18 is processed as analog information in the CPU (not shown) on the circuit board 78, and is converted to digital coordinate data. The digital coordinate data, as converted, are then output via a connector section (not shown) provided in the circuit board 78 to a processing mechanism of a data processor (not shown). In this manner, it is possible to shift, e.g., a cursor or pointer on the display screen of the data processor in a desired direction by a desired distance, in correspondence to the rocking direction, and angle, of the cover 90 of the operating part 74.

Also, the cover 90, constituting the second member of the operating part 74, is not only rockable together with the holder 88 but also linearly movable relative to the holder 88 and magnet 76, along an axis passing through the rocking center P, as another motion different from the three-dimensional rocking motion, under a mutual guiding function in the peripheral wall 88a of the holder 88 and the pusher 98. That is, the cover 90 is capable of being linearly moved on the base part 72 independently from the magnet 76. Such a linear motion of the cover 90 is conducted for applying or releasing a pressing force acting on the movable contact plate 58 (FIG. 4) of the switch mechanism 20, on which the pusher 98 is supported.

Figure 11:
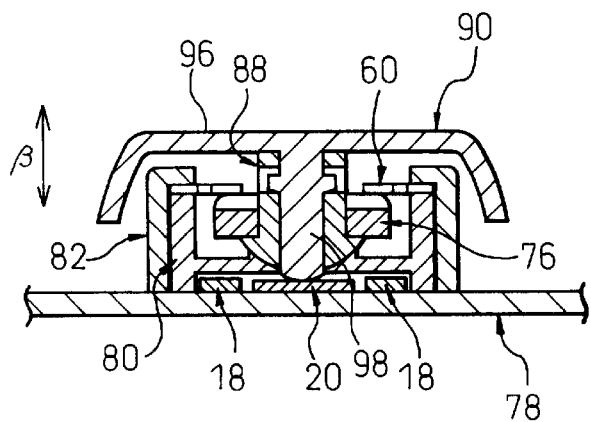
FIG. 11 is a vertical sectional view of the pointing device of FIG. 8, for explaining a linear motion of an operating part.

Accordingly, as shown in FIG. 11, it is possible for the operator to manipulate the cover 90, in a linear motion as shown by an arrow β, against the spring force of the movable contact plate 58 in the switch mechanism 20, so as to actuate the switch mechanism 20, without changing the positional correlation between the magnet 76 and four magneto-electro transducers 18. When the switch mechanism 20 is actuated to close, the CPU on the circuit board 78 processes a click signal thus generated from the switch mechanism 20 and outputs the same to the processing mechanism of the data processor. In this manner, it is possible to perform, e.g., a click operation for the pointer on the display screen by pressing the cover 90 of the operating part 74.

As stated above, according to the pointing device 70, it is possible to push the operating part 74 toward the base part 72, without changing the positional correlation between the magnet 76 and the magneto-electro transducers 18, when it is required to actuate the switch mechanism 20. This motion is capable of being properly conducted in a state where the operating part 74 is not only in the initial balanced position but also in any desired rocking-angle positions. Accordingly, in the pointing device 70, it is not necessary to accurately shift the operating part 74 in the vertical direction relative to the base part 72 for the click operation, similar to the pointing device 10 according to the first embodiment. As a result, it is possible to easily perform a proper and accurate click operation through a manipulation mode clearly different from that for an analogue data entering operation, without requiring the provision of any additional vertically-guiding mechanism and/or an operator's skill.

In the above structure, it is advantageous that a supplementary coupling structure is provided to assist the coupling of the holder 88 with the cover 90 so as to transmit, with substantially no loss, a rocking operation force caused by the operator and a spring force generated from the plate spring 60 as a reaction of the operation force, between the first member (or the holder 88) and the second member (or the cover 90) in the operating part 74. In the illustrated embodiment, the supplementary coupling structure includes a pair of openings 102 provided at two desired positions opposite to each other in the peripheral wall 88a of the holder 88, and a pair of engagement pawls 104 projecting from the outer surface of the pusher 98 of the cover 90 in a configuration corresponding to the configuration of the openings 102. Each engagement pawl 104 of the pusher 98 is capable of being snap-fit with each opening 102 of the holder 88. In this case, it is desirable that the opening 102 of the holder 88 has an axial dimension for allowing the axial displacement of the counterpart pawl 104 of the cover 90 over, at least, the shifting distance of the pusher 98 required for the click operation, while has a circumferential dimension for enabling the pusher 98 to be prevented from rotating. In this manner, the holder 88 and the cover 90 are coupled to each other to be movable substantially solely in the axial direction, so that it is possible to transmit the force between the holder 88 and the cover 90 with substantially no loss.

The pointing device 10, 70 with the magneto-electro transducers is capable of minimizing the exposed area of the operating part 14, 74 in the upper surface of the casing of a data processor, into which the pointing device is incorporated, without deteriorating the operability of the operating part. Therefore, the pointing device 10, 70 is advantageously incorporated particularly into portable information apparatuses for hand-held operation, such as electronic notebooks, personal digital assistants (PDAs), mobile phones, etc. In the case where the pointing device 10, 70 is installed in such a portable information apparatus, it is required to stably and effectively connect the pointing device 10, 70 with the major circuit board of the information apparatus in both electrical and mechanical way, regardless of the relatively narrow interior space of the casing of the portable apparatus.

FIGS. 12 to 18 show a pointing device 110, according to the third embodiment of the present invention, having superior properties in the electrical and mechanical connection structure. In this regard, the pointing device 110 has substantially the same construction as the pointing device 70 of the second embodiment as described, except for the electrical and mechanical connection structure, so that the corresponding components are denoted by common reference numerals and the explanation thereof is not repeated.

Figure 12:
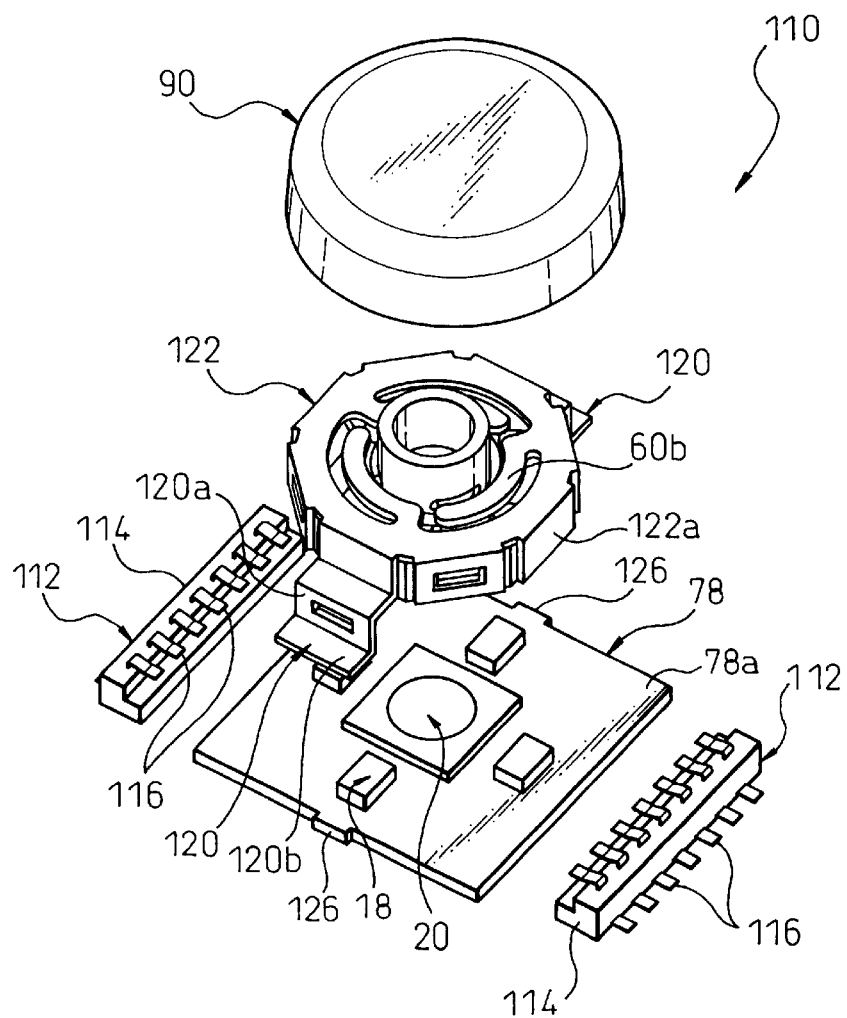
FIG. 12 is an exploded perspective view of a pointing device according to a third embodiment of the present invention.

As shown in FIG. 12, the pointing device 110 includes two connectors 112 for electrically connecting magneto-electro transducers 18 and a switch mechanism 20 with an external circuit board M. Each connector 112 includes an insulating member 114 fixedly joined to an outer peripheral region of a base plate portion (or a circuit board 78) of a base part 72 (FIG. 8) and a plurality of terminals 116 supported on the insulating member 114 in a mutually insulating arrangement in an array. The circuit board 78 is provided on the surface 78a thereof with a plurality of electrodes (not shown), formed along a desired outer peripheral region, and connected with the magneto-electro transducers 18 and the switch mechanism 20 via, e.g., a printed circuit. The respective terminals 116 of the connector 112 are attached by, e.g., a solder, at one end 116a thereof to the respective electrodes on the circuit board 78, so as to be electrically connected to the magneto-electro transducers 18 and the switch mechanism 20 (see FIG. 13). The other ends 116b of the respective terminals 116 extend outward from the circuit board 78, and are fixed by, e.g., solder 118, to the respective electrodes (not shown) similarly formed on the external circuit board M (see FIG. 14).

The insulating member 114 of the connector 112 is a bar-shaped member integrally molded from a resinous material through, e.g., an insert molding process so as to embed the terminals 116 in the bar-shaped member. The insulating member 114 is provided with a flat top surface 114a from which the first end 116a of the terminal 116 projects, a bottom surface 114b extending parallel to the top surface 114a, an inside surface 114c extending orthogonal to the top surface 114a, a base-plate support surface 114d extending parallel to the top surface 114a and orthogonal to the inside surface 114c, and an outside surface 114e extending parallel to the inside surface 114c, from which the second end 116b of the terminal 116 projects outward (see FIG. 15). Each terminal 116 is arranged so that the first end 116a thereof extends above and generally parallel to the base-plate support surface 114d of the insulating member 114. On the other hand, the second end 116b of the terminal 116 projects, in a direction away from the first ends 116a, from the outside surface 114e, and extends generally parallel to the bottom surface 114b of the insulating member 114.

Thus, each connector 112 is assembled with the circuit board 78, so that the first ends 116a of the terminals 116 are respectively positioned relative to the electrodes on the surface 78a of the circuit board 78, and that the inside surface 114c and the base-plate support surface 114d of the insulating member 114 are abutted with the outer peripheral area of the circuit board 78. Also, each connector 112 is mounted to the external circuit board M, so that the second ends 116b of the terminals 116 are respectively positioned relative to the electrodes on the surface of the external circuit board M, and that the bottom surface 114b of the insulating member 114 is abutted with the surface of the circuit board M.

The insulating member 114 of the connector 112 is preferably shaped and dimensioned so that a gap defined between the first ends 116a of the terminals 116 and the base-plate support surface 114d of the insulating member 114 is slightly smaller than the thickness of the circuit board 78 in a condition where the first ends 116a are not elastically deformed. According to this arrangement, it is possible to hold the outer peripheral region of the circuit board 78 between the first ends 116a of the terminals 116 and the base-plate support surface 114d of the insulating member 114 by utilizing the elastic deformation or bending of the terminals 116, when the connector 112 is mounted to the circuit board 78. Consequently, it is ensured that a desired contact pressure is easily obtained between the first ends 116a of the respective terminals 116 and the electrodes on the circuit board 78, and it is possible that the connector 112 is temporarily secured on the circuit board 78 until the soldering of the first ends 116a of the terminals 116 has completed, which improves the mounting operability. When the connector 112 is properly mounted to the circuit board 78, the second ends 116b of the terminals 116 of the connector 112 is maintained in laterally projecting from the outside surface 114e of the insulating member 114, so that the soldering work of the terminals 116 to the electrodes on the external circuit board M is facilitated.

As will be understood from the above, the connector 112 has an extremely simple structure wherein the plural terminals 116 are embedded in the bar-shaped insulating member 114, which advantageously facilitates a reduction in a total size and a terminal pitch, as well as the mounting work of the pointing device 110 onto the circuit board 78 and the external circuit board M. Accordingly, in the case where the pointing device 110 is mounted to a portable information apparatus, it is possible to stably and effectively connect the pointing device 110 with the major circuit board of the information apparatus in an electrical way, in the relatively narrow interior space of the casing of the portable apparatus.

The pointing device 110 further includes a pair of fitting portions 120 extending outward from the circuit board 78 (see FIG. 12). The fitting portions 120 are formed integrally with or as a part of a third frame 122 made by, e.g., stamping a sheet metal and bending a blank into a desired shape. The third frame 122 includes a tubular portion 122a substantially encircling the first and second frames 80, 82 (FIG. 8) constituting the support portion of the base part 72, and is fixedly coupled to the first and second frames 80, 82. The respective fitting portions 120 are disposed at diametrically opposed positions on the tubular portion 122a of the third frame 122 and laterally extend from the tubular portion 122a along the surface 78a of the circuit board 78, so that the intermediate length 120a of each fitting portion 120 extends downward in generally orthogonal to the surface 78a of the circuit board 78 and the free end length 120b thereof extends outward in generally orthogonal to the intermediate length 120a.

Figure 13:
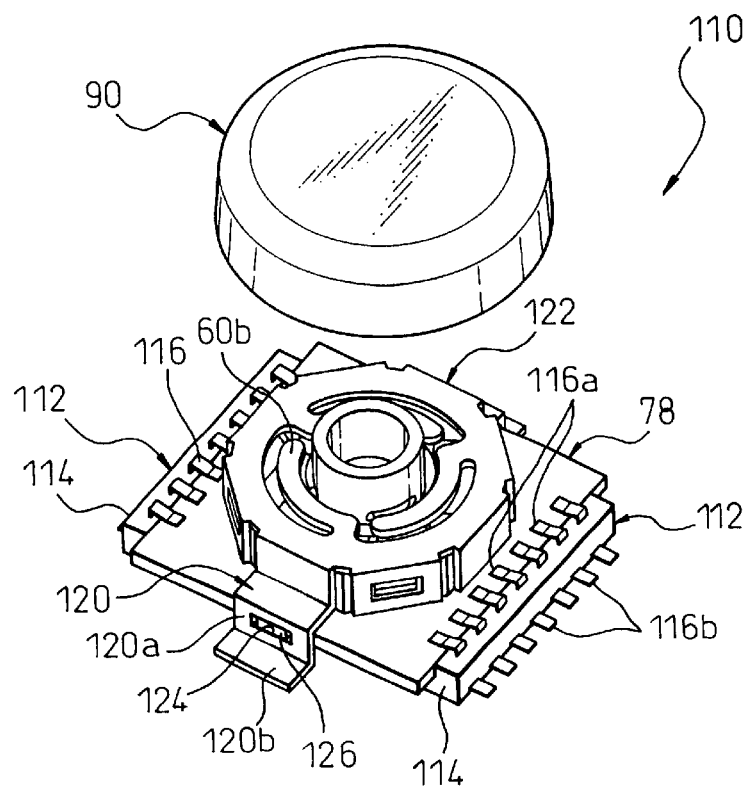
FIG. 13 is a perspective view showing the pointing device of FIG. 12 in a partially assembled state.
Figure 14:
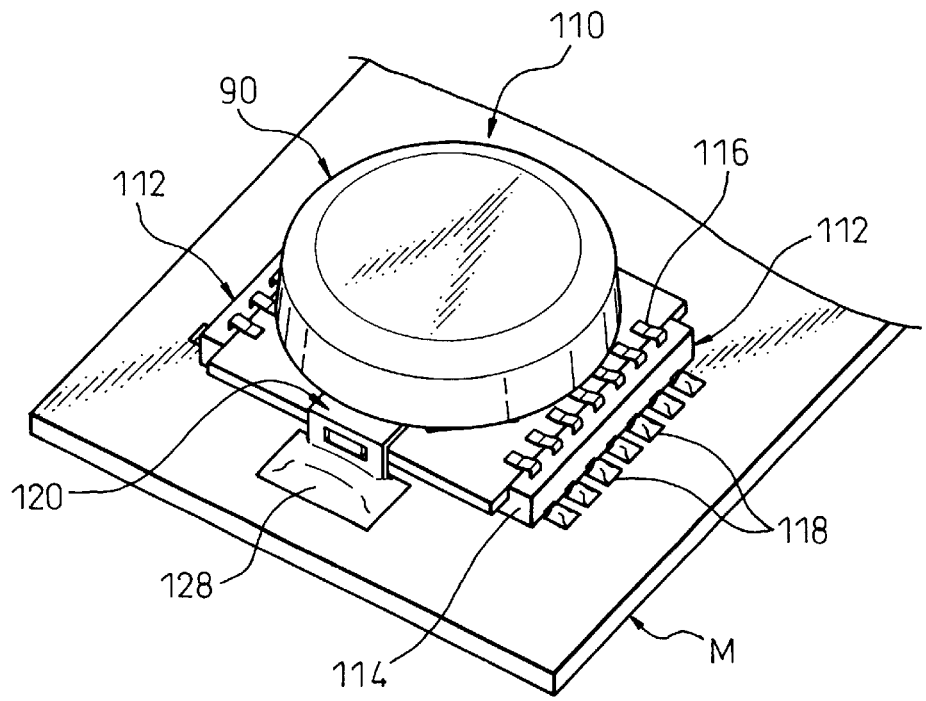
FIG. 14 is a perspective view showing the pointing device of FIG. 12 in a state of being mounted on an external circuit board.
Figure 15:
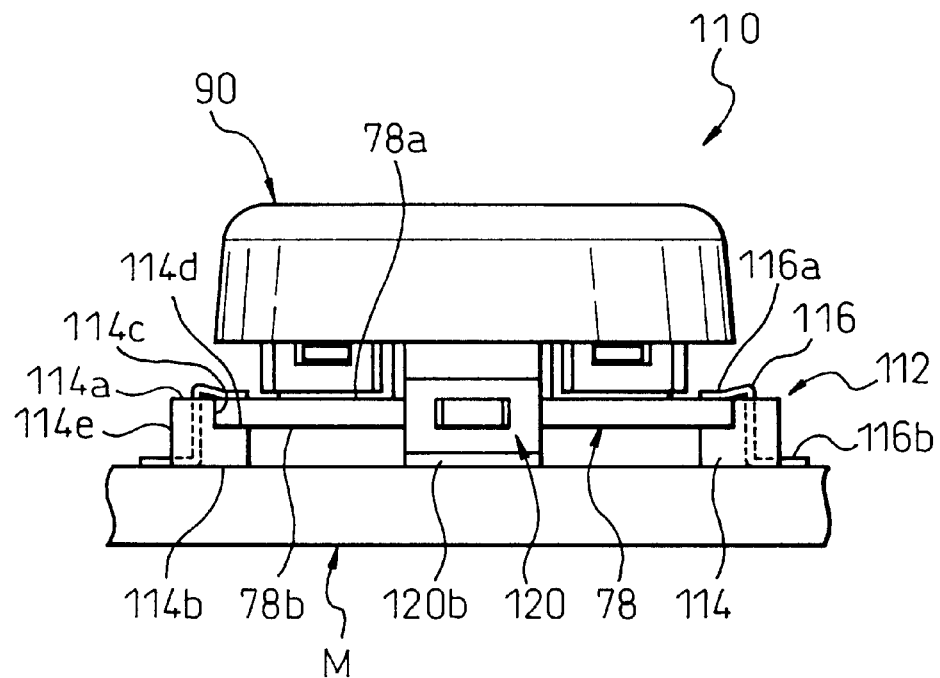
FIG. 15 is a plan view showing the pointing device of FIG. 12 in a state of being mounted on an external circuit board.
Figure 16:
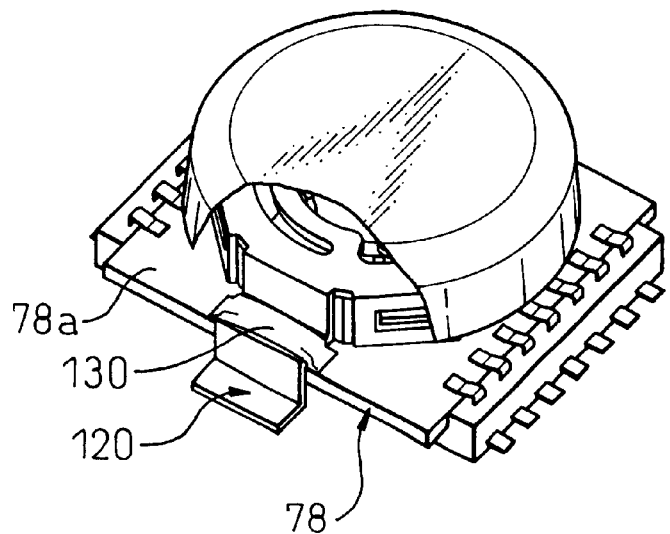
FIG. 16 is a perspective view of a modification of the pointing device of FIG. 12.

Each fitting portion 120 is provided in the intermediate length 120a thereof with an opening 124. In association therewith, the circuit board 78 is provided on the outer edge thereof with projections 126 capable of being tightly engaged with or fitted into the openings 124 of the fitting portions 120 at positions corresponding to the respective fitting portions 120. In this structure, when the projections 126 of the circuit board 78 are fitted into the openings 124 of the corresponding fitting portions 120, it is possible to securely hold the third frame 122, together with the first and second frames 80, 82, at a predetermined position on the circuit board 78 (FIG. 13). Therefore, in this case, the structure for fixedly coupling the first and second frames 80, 82 with the circuit board 78 can be eliminated. Also, the second frame 82 may be eliminated.

When the third frame 122 is properly fixed onto the circuit board 78, the free end length 120b of each fitting portion 120 laterally extends or projects in parallel to the surface 78a of the circuit board 78 at a location lower than a back surface 78b of the circuit board 78. In this respect, a distance between the back surface 78b of the circuit board 78 and a back side of the free end length 120b of each fitting portion 120 is selected to be substantially equal to a distance between the bottom surface 114b and the base-plate support surface 114d in the insulating member 114 of the connector 112 (see FIG. 15). Therefore, when the pointing device 110 is mounted to the external circuit board M through the connectors 112 as described, the free end lengths 120b of the respective fitting portions 120 are abutted to the surface of the circuit board M. Then, the free end lengths 120b of the fitting portions 120 are fixed to the surface of the circuit board M by, e.g., solder 128, whereby the base part 72 of the pointing device 110 is mechanically connected to the circuit board M through the pair of fitting portions 120. This mechanical connection structure using the fitting portions 120 serves to reinforce the electrical and mechanical connection between the connectors 112 and the circuit board M with solder, so that it is possible to firmly and stably secure the pointing device 110 onto the circuit board M, even when the cover 90 is subjected to the rocking and linear motions caused by the operator as described.

As will be understood from the above, the fitting portions 120 fixedly joined to the support portion of the base part 72 is capable of being formed from a sheet metal as a part of the third frame 122, which advantageously facilitates a reduction in size and thickness of each fitting portion, without deteriorating the rigidity thereof, as well as the mounting work of the pointing device 110 onto the external circuit board M. Accordingly, in the case where the pointing device 110 is mounted to a portable information apparatus, it is possible to stably and effectively connect the pointing device 110 with the major circuit board of the information apparatus in a mechanical way, in the relatively narrow interior space of the casing of the portable apparatus.

Figure 17:
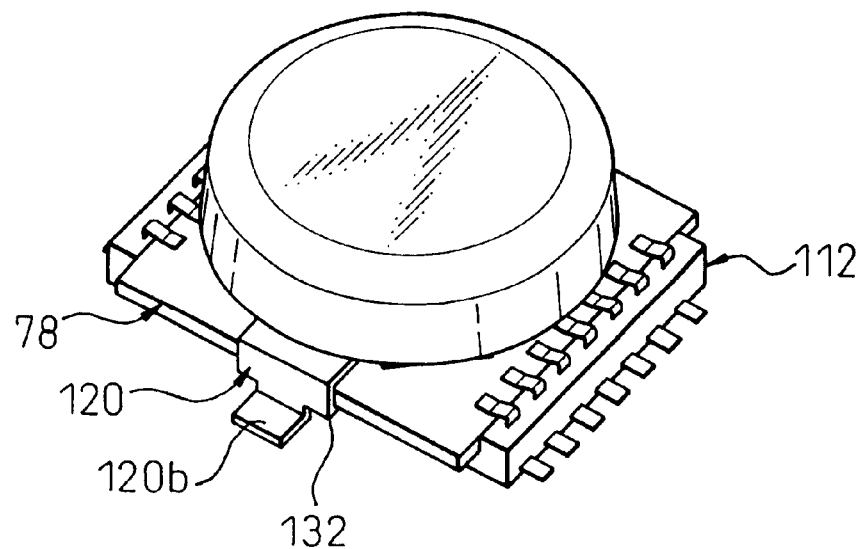
FIG. 17 is a perspective view of another modification of the pointing device of FIG. 12.
Figure 18:
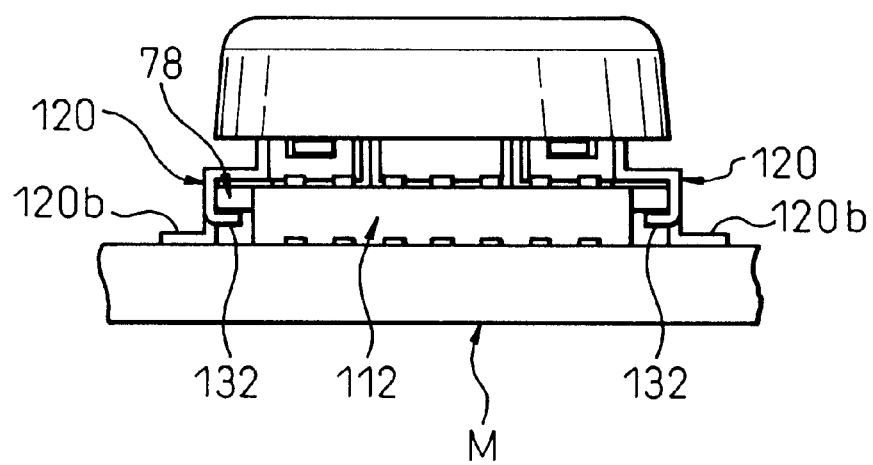
FIG. 18 is a front view showing the pointing device of FIG. 17 in a state of being mounted on an external circuit board.

As in the illustrated embodiment, the plural second portions 60b of the plate spring 60 may be formed integrally with or as a part of the third frame 122 including the fitting portions 120 (FIG. 12). According to this structure, it is possible to reduce the number of parts and to simplify the assembling work of the pointing device. Also, instead of the illustrated structure wherein the fitting portion 120 is secured to the circuit board 78 by the interengagement between the opening 124 and the projection 126 of the circuit board 78, it is possible to adopt the other securing structures, such as solder 130 (FIG. 16) or the provision of bends 132 in the fitting portion 120 for holding the outer peripheral region of the circuit board 78 (FIGS. 17 and 18).

While several preferred embodiments have been described with reference to the drawings, it should be noted that the present invention may have various forms other than the illustrated embodiments. For example, the solution in the first or second embodiment, in which the operating part 14, 74 is formed from the first member (the holder 30, 88) and the second member (the cover 32, 90 and the pusher 34) coupled to each other in a relatively movable manner, may be effectively applied in a pointing device in which a positional correlation between the magnet 16, 76 and the plural magneto-electro transducers 18 is opposite to the illustrated configuration, that is, wherein the magneto-electro transducers 18 provided in the operating part 14 are shifted relative to the magnet 16, 76 provided in the base part 12. This alternative arrangement is expected to provide the same particular effects as in the illustrated embodiments. Also, the above solution by using the first and second member as the operating part may be applied to a pointing device in which the operating part is shifted in a flat plane generally parallel to the base part or a curved surface, for entering analog information, instead of the rocking operation as described. Further, the solutions by using the connector 112 and by using the fitting portion 120, in the third embodiment, may be applied, individually or in combination, to the pointing device 10 according to the first embodiment or the other pointing devices having no switch mechanism 20. In these alternative arrangements, it will also be expected to obtain the same particular effects as in the illustrated embodiment.

While the invention has been particularly shown and described with reference to preferred embodiments thereof, it will be understood by those skilled in the art that various changes and modifications may be made without departing from the spirit and scope of the following claims.

What is claimed is:

1. A pointing device, comprising:
   a base part;
   an operating part shiftably supported on the base part and comprising a first member and a second member;
   a magnet carried on one of the base part and the operating part;
   a magneto-electro transducer carried on the other of the base part and the operating part at a location adjacent to the magnet; and
   a switch mechanism arranged between the base part and the operating part,
   the first member carrying one of the magnet and the magneto-electro transducer and the second member engaging the first member in a mutually shiftable manner, the first member, carrying the one of the magnet and the magneto-electro transducer, shifting relative to the base part to cause a relative displacement between the magnet and the magneto-electro transducer, the second member shifting relative to the first member carrying the one of the magnet and the magneto-electro transducer to actuate the switch mechanism.

2. The pointing device of claim 1, wherein the first member of the operating part has a rocking center and is rockably supported on the base part, and wherein the second member of the operating part moves in a rocking motion together with the first member, about the rocking center and shifts relative to the first member in a motion different from the rocking motion.

3. The pointing device of claim 2, wherein the second member of the operating part linearly shifts along an axis extending through the rocking center relative to the first member.

4. The pointing device of claim 2, wherein the base part includes a base plate portion carrying the switch mechanism and a support portion fixedly joined to the base plate portion and rockably supporting the first member of the operating part above the switch mechanism, and wherein the second member of the operating part extends through the support portion to be abut against the switch mechanism.

5. The pointing device of claim 4, wherein the second member of the operating part comprises a plurality of wall portions extending through the support portion of the base part, the first member being slidably engaged internally with the wall portions.

6. The pointing device of claim 4, wherein the second member of the operating part comprises a column portion extending through the support portion of the base part, the first member being slidably engaged externally with the column portion.

7. The pointing device of claim 1, wherein the second member of the operating part is supported on the switch mechanism.

8. The pointing device of claim 1, wherein the base part comprises:
   a base plate portion connected respectively with the magneto-electro transducer and the switch mechanism; and
   a connector electrically connecting the magneto-electro transducer and the switch mechanism to an external circuit board,
   the connector comprising
      an insulating member fixedly joined to an outer peripheral region of the base plate portion, and
      a plurality of terminals supported on the insulating member in a mutually insulating arrangement in an array, each of the terminals being electrically connected at one end thereof with the magneto-electro transducer and the switch mechanism through the base plate portion, the one end of each terminal cooperating with the insulating member to hold therebetween the outer peripheral region of the base plate portion.

9. The pointing device of claim 1, wherein the base part comprises:
   a base plate portion connected respectively with the magneto-electro transducer and the switch mechanism; and
   a fitting portion extending outward from the base plate portion, the base part being fitted through the fitting portion to an external circuit board.

10. The pointing device of claim 9, further comprising an elastic member elastically positioning the first member of the operating part at an initial balanced position on the base part, wherein the fitting portion of the base part is integrally joined to the elastic member.

11. A pointing device, comprising:
    a base part comprising a base plate portion and a connector, and the connector comprising an integrally molded insulating member embedding a plurality of terminals therein;
    an operating part shiftably supported on the base part;
    a magnet carried on one of the base part and the operating part; and
    a magneto-electro transducer carried on the other of the base part and the operating part at a location adjacent to the magnet,
    the base plate portion connecting to the magneto-electro transducer and the connector electrically connecting the magneto-electro transducer to an external circuit board, and
    the insulating member being fixedly joined to an outer peripheral region of the base plate portion, and the plurality of terminals being supported on the insulating member in a mutually insulating arrangement in an array, each of the terminals being electrically connected at one end thereof with the magneto-electro transducer through the base plate portion, the one end of each terminal cooperating with the insulating member to hold therebetween the outer peripheral region of the base plate portion.

12. A pointing device comprising:
- a base part comprising a base plate portion, a support portion, and a fitting portion;
- an operating part shiftably supported on the base part;
- a magnet carried on one of the base part and the operating part;
- a magneto-electro transducer carried on the other of the base part and the operating part at a location adjacent to the magnet; and
- an elastic member elastically positioning the operating part at an initial balanced position on the base part, the fitting portion of the base part being integrally joined to the elastic member,
- the base plate portion connecting to the magneto-electro transducer, the support portion being fixedly joined to the base plate portion and shiftably supporting the operating part above the base plate portion, and the fitting portion extending outward from the base plate portion, the base part being fitted through the fitting portion to an external circuit board.

* * * * *

UNITED STATES PATENT AND TRADEMARK OFFICE
CERTIFICATE OF CORRECTION

PATENT NO. : 6,707,446 B2
DATED : March 16, 2004
INVENTOR(S) : Shuji Nakamura

It is certified that error appears in the above-identified patent and that said Letters Patent is hereby corrected as shown below:

<u>Column 19,</u>
Line 1, after "device" insert -- , --.

Signed and Sealed this

Fifteenth Day of June, 2004

JON W. DUDAS
*Acting Director of the United States Patent and Trademark Office*